Figure 1:
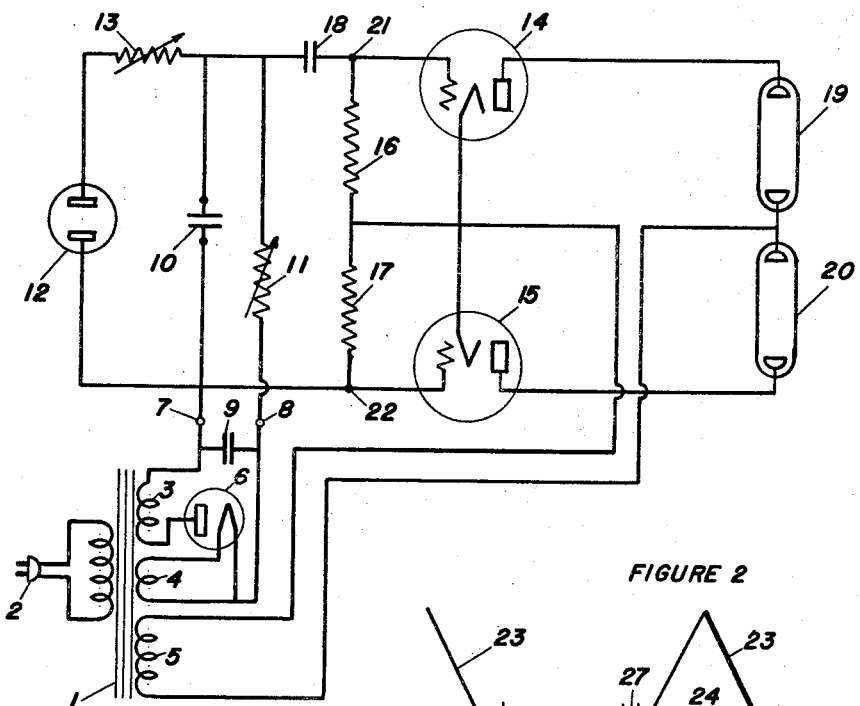

Oct. 26, 1937.   J. C. BATCHELOR   2,097,400
ILLUMINATING DEVICE
Filed March 30, 1935

INVENTOR
John C. Batchelor

Patented Oct. 26, 1937

2,097,400

UNITED STATES PATENT OFFICE 2,097,400

ILLUMINATING DEVICE

John C. Batchelor, New York, N. Y., assignor to Affiliated Industrial Corporation, New York, N. Y., a corporation of New York Application March 30, 1935, Serial No. 13,982

8 Claims. (Cl. 176—124)

My invention relates to an electrical illuminating device for producing pulses of light of alternating different colors in a manner particularly suited to create the illusion of animation of a colored image having certain portions of each of the colors produced by my device.

It is known in the art to produce advertising displays and the like comprising a picture or the like in which it is desired to show two positions of operation, two sizes of letters or some other form of animation, in which case the images for the alternating positions are painted or printed in, for example, red and green, and the entire picture is alternately illuminated with red and green light so that, in the example given, when red light is shone upon the image, the red portions appear illuminated but the green portions appear black, and when green light is shone upon the picture, the green portions appear illuminated and the red portions appear black. Thus, by alternately applying green and red illumination to the image, the illusion of motion is created wherein the image appears to move between the positions indicated by the red and green images.

Thus, a display device which creates the illusion of animation may be produced in which there are no moving parts or changing lights in the image itself.

In all such devices prior to my invention, it has been customary to provide the alternating illumination by using, for example, an incandescent lamp before which is rotated a shutter disc, drum or the like having alternately red and green color screens with such a speed and in such a manner as to produce the desired alternate illumination. In other instances mechanical commutating devices have been used alternately to excite a pair of sources of light having suitable color characteristics or provided with suitable color filters to produce a similar result.

Such mechanical devices have certain inherent disadvantages such as the fact that lubrication is required periodically; moreover, inefficient operation results from the requirement of appreciable power to actuate the motor of the device and appreciable power is lost in absorbed light in the color filters used.

In view of these and other disadvantages of devices which have previously been proposed, it is an object of my invention to provide an improved electrical illuminating device having no moving parts and which will therefore be simple and reliable in operation.

In accordance with my invention I have provided a pair of glow-discharge tubes capable of emitting green and red light, respectively, and connected in the respective plate circuits of a pair of thermionic valves connected in push-pull fashion, the grids of which are controlled by a voltage wave such that a substantially rectangular wave-form is imparted to the plate currents of the valves so that the glow-discharge tubes are alternately extinguished and caused to glow, thereby alternately illuminating the glow-discharge devices.

Figure 2:
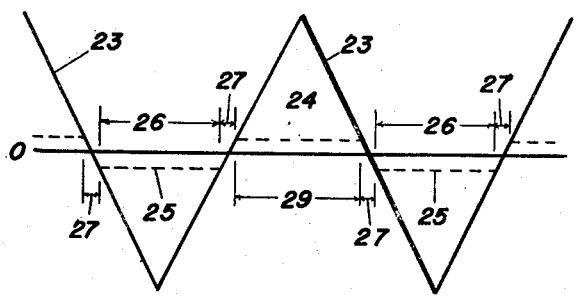
Figure 3:
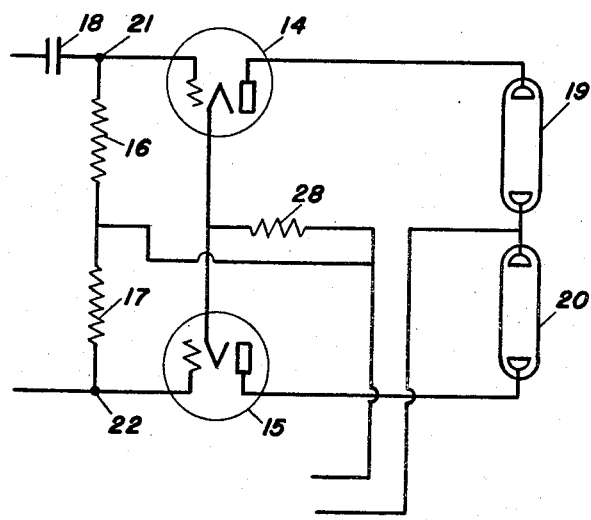

In order to describe my invention more fully attention is directed to the accompanying drawing, in which Figure 1 represents a schematic circuit of a preferred embodiment of my invention; Figure 2 represents a wave form of certain alternating voltages which appear in the operation of my invention; and Figure 3 represents a certain modification of the embodiment shown in Figure 1.

Referring now to Figure 1, a power supply unit 1 is adapted to be connected to a source of alternating current power, such, for example, as is available commercially, by the plug connector 2, and is provided with a transformer having the secondaries 3, 4, and 5. The secondary winding 4 is adapted to heat the thermionic cathode of the thermionic rectifier 6 and the secondary winding 3 is connected between the plate of the rectifier 6 and the output terminal 7 of the power supply unit 1. The second output terminal 8 of the unit 1 is connected to one side of the secondary winding 4 and a smoothing capacitor 9 is provided across the terminals 7 and 8 whereby a substantially constant direct current potential is provided at those terminals.

A capacitor 10 is adapted to be charged by the potential between the terminals 7 and 8 at a substantially constant rate through the variable charging resistor 11. A glow-discharge tube 12 is connected across the capacitor 10 and in series with the variable discharge resistor 13.

A pair of suitable thermionic valves 14 and 15 connected in push-pull fashion are provided and the grid circuits of those tubes are provided with the grid leaks 16 and 17 and are adapted to be excited by the alternating component of voltage appearing across the condenser 10 and communicated to the grids through the coupling capacitor 18. The glow-discharge tubes 19 and 20 are provided in the respective plate circuits of the valves 14 and 15, and are adapted to be provided with alternating power from the secondary 5 of the power supply unit 1.

The operation of my device is as follows. Upon excitation of the power supply unit 1 by insertion of the plug connector 2 in an appropriate power outlet, a direct current potential of, for example, 600 volts appears across the output terminals 7 and 8. The capacitor 10 immediately begins to acquire a charge through the charging resistor 11 and the potential difference across the terminals of the capacitor 10 continues to rise until that potential difference rises to the break-down potential of the glow-discharge tube 12, whereupon the glow-discharge tube 12 does break down and current flows through the resistor 13 and the tube 12 until the potential difference across the capacitor 10 decreases to the break-off voltage of the tube 12, whereupon the glow-discharge in the tube 12 is extinguished and the capacitor 10 is again re-charged from the potential difference across the terminals 7 and 8 through the resistor 11. Thereafter, the system comprising the resistors 11 and 13, the capacitor 10 and the glow-discharge tube 12 provided with power from the terminals 7 and 8 continues to oscillate in the manner just described. It may be seen that the form of the alternating component of the potential across the terminals of the capacitor 10 may be caused to be substantially an equilateral triangle by mutually adjusting the resistors 11 and 13 in a manner such that the periods of charging and discharging of the capacitor 10 are of equal duration.

By means of the coupling capacitor 18, the alternating component of the potential difference which appears across the capacitor 10 is impressed across the grid leaks 16 and 17 in series and is therefore impressed upon the grids of the valves 14 and 15 in alternately opposite phase relation. The valves 14 and 15 are so chosen as to have their plate current cut off by the application of a negative voltage on the grid appreciably less than the alternating component of the potential which appears across the capacitor 10, and consequently, at the moment the terminal 21 is positive with respect to neutral, the terminal 22 will be negative with respect to neutral and will have such a negative voltage as to completely cut off the plate current in the valve 15. At this instant therefore, the valve 14 only will be conductive and the alternating potential of the secondary 5 will be rectified by the valve 14, the glow-discharge tube 19 will be broken down, and a pulsating direct current will continue to flow in the tube 19 until such time as the grid of the valve 14 is rendered sufficiently negative that the internal impedance of the valve 14 will render the potential fall across the tube 19 less than the break-off voltage of that tube, whereupon the glow-discharge will be extinguished. Thus this effect of the valve 14 is to disconnect the power source from the tube 19. Simultaneously, however, the negative potential will have been removed from the grid of the valve 15 so that that valve 15 will be rendered sufficiently conductive to allow the glow-discharge tube 20 to be broken down, the effect in this instance being to connect the power source to the tube 20. From this point forward, the tubes 19 and 20 will be alternately illuminated in accordance with the potential across the capacitor 10 impressed upon the grids of the valves 14 and 15. These valves thus serve as thermionic switching means controlling the power supply to the tubes 19 and 20. Because of the fact that a voltage appears across the capacitor 10 which has several times the value of the grid cut-off voltages of the tubes 14 and 15, the instant of break-off of the tube 20 will be substantially simultaneous with the break-down of the tube 19 and consequently the light resulting from the glow-discharges in the tubes 19 and 20 will alternate with substantially equal periods of illumination and extinction. These periods will occur at a frequency dependent on the voltage applied to terminals 7 and 8, on the capacitance of capacitor 10 and on the resistances of resistors 11 and 13. By proper selection of the magnitudes of these elements this frequency may be higher or lower than the frequency of the power source, of which it is independent. Ordinarily, and in connection with advertising displays and the like, this frequency would be lower than that of the power source.

This operation may be understood somewhat more clearly by referring to Figure 2 which represents the alternating voltage which is generated across the capacitor 10. As has been described, the voltage wave 23 when referred to the neutral line 0 is substantially an equilateral triangle provided the resistors 11 and 13 are adjusted to produce substantially equal periods of charge and discharge of the condenser 10. In the example given, if the break-down voltage of the glow-discharge tube 12 is 500 volts and the break-off voltage of that tube is 200 volts, the maximum potential which appears across the capacitor 10 will be approximately 500 volts and the minimum potential will be approximately 200 volts, so that the difference between those two voltages will be approximately 300 volts. Thus, an alternating current having a peak potential of approximately 150 volts will appear across the capacitor 10 and be communicated to the grid input terminals 21 and 22 of the valves 14 and 15. Such a potential wave is indicated at 23. If the grid cut-off potential of the tubes 14 and 15 under the prevailing conditions of operation is 15 volts as indicated by the broken lines 24 and 25, it is clear that one valve will be conductive during the intervals 29, the other valve will be conductive during the intervals 26, and both valves will be non-conductive during the intervals 27. In the example shown, it may be seen from Figure 2, that, with an impressed voltage of the order of ten times the value of the grid cut-off voltage of the valves 14 and 15, the percentage of time during which both of the discharge tubes 19 and 20 are extinguished will be of the order of 10 percent of the total time.

Referring now to Figure 3, a method is indicated whereby that 10 percent portion of the time during which both tubes are extinguished may be minimized or eliminated. In this case a self biasing resistor 28 has been inserted in the plate circuit cathode return lead, and the more negative end of that resistor has been connected to the grid circuit so that, assuming that one of the tubes 19 or 20 is illuminated, a current will flow in the resistor 28 which will impress a somewhat negative bias on the grids of the valves 14 and 15. If, for example, the terminal 21 is negative and the terminal 22 is positive, the tube 20 will be illuminated and the discharge current flowing in the resistor 28 will render the point 21 more negative with respect to the cathode of the tube 14 than would be caused alone by the input voltage from the capacitor 10 and consequently the valve 14 will be maintained non-conductive until such time as the tube 20 is extinguished, whereupon the current in the resistor 28 will be eliminated and the component of voltage at the point 21 which had been caused by the potential fall across the resistor 28 will be lost. The tube 19 will therefore become conductive immediately. Thus, upon insertion of the resistor 28, I have introduced into my circuit an effect somewhat analogous to regeneration and I have thus improved the rectangularity of the potential wave which is impressed upon the grids of the valves 14 and 15.

A further degree of universality is possible with my device by use of the variable resistors 11 and 13. It is clear that in order to achieve equal periods of illumination of the tubes 19 and 20, it is necessary to adjust the resistors 11 and 13 to produce a voltage wave 23 which is an equilateral triangle. In general, I prefer to construct those two resistors 11 and 13 on a common shaft and having suitable characteristics of resistance versus rotation that the triangularity of the wave generated by the oscillator will be maintained for all positions of the single shaft controlling the resistors 11 and 13. Thus, the frequency of flashing becomes readily controllable by rotating that shaft. In certain instances, however, it is desirable to render the duration of the flash of one color greater than the duration of the flash of the other color. This may be done by maintaining the independence of the controls of the resistors 11 and 13 and so adjusting the values of those resistors that the duration of the charging period of the capacitor 10 is greater or smaller than the duration of the time of discharge of that condenser as desired.

I claim:

1. An electrical illuminating device comprising a source of direct current potential, a low frequency oscillator actuated by said source of potential and comprising a glow-discharge tube and a capacitor, a pair of thermionic valves in a push-pull circuit, circuit means for impressing upon the grids of said valves the alternating potential across the terminals of the capacitor of said oscillator whereby the plate circuits of said valves may be rendered alternately conductive and non-conductive, and a pair of light producing elements in the respective plate circuits of said thermionic valves and actuated by the plate currents of said valves.

2. An electrical illuminating device comprising a source of direct current potential, a low frequency oscillator actuated by said source of potential and comprising a capacitor, a resistor through which said capacitor is adapted to be charged, a glow-discharge tube and a second resistor through which said capacitor is adapted to be discharged by said glow-discharge tube; said device further comprising a pair of thermionic valves including grid and plate circuits, circuit means for impressing uopn the grids of said valves the alternating potential across the terminals of the capacitor of said oscillator whereby the plate circuits of said valves may be rendered alternately conductive and non-conductive, and a pair of light producing elements in the respective plate circuits of said thermionic valves and actuated by the plate currents of said valves.

3. An electrical illuminating device comprising a source of direct current potential, a low frequency oscillator actuated by said source of potential and comprising a capacitor, a resistor through which said capacitor is adapted to be charged, a glow-discharge tube and a second resistor through which said capacitor is adapted to be discharged by said glow-discharge tube; said device further comprising a pair of thermionic valves including grid and plate circuits, circuit means for impressing upon the grids of said valves the alternating potential across the terminals of the capacitor of said oscillator whereby the plate circuits of said valves may be rendered alternately conductive and non-conductive, and a pair of glow-discharge tubes in the respective plate circuits of said thermionic valves whereby light may be produced in accordance with the plate currents of said valves.

4. An electrical illuminating device comprising a source of direct current potential, a low frequency oscillator actuated by said source of potential and comprising a capacitor, a resistor through which said capacitor is adapted to be charged, a glow-discharge tube and a second resistor through which said capacitor is adapted to be discharged by said glow-discharge tube; said device further comprising a pair of thermionic valves, including grid and plate circuits both having common cathode return circuits, circuit means for impressing upon the grids of said valves the alternating potential across the terminals of the capacitor of said oscillator whereby the plate circuits of said valves may be rendered alternately conductive and non-conductive, a resistor in the common portion of said plate circuits whereby a voltage drop proportional to the current flowing in said common portion may be produced, circuit means for applying said voltage drop to the grids of said valves with a polarity operative to reduce the current causing said voltage drop, and a pair of light producing elements in the respective plate circuits of said thermionic valves and actuated by the plate currents of said valves.

5. In an illuminating device, the combination of a pair of electric discharge-tube light sources, an electrical power source therefor, and means for generating a low-frequency alternating potential; with substantially potential-operated thermionic control means including a pair of thermionic valves each having a control electrode, an output electrode, and circuits therefor, said control electrode circuits being adapted to be actuated in opposite phase relation by voltages impressed thereon from said alternating potential generating means, and said light sources being energized alternately and successively by the respective outputs of said valves and said power source in accordance with the alternating potentials impressed on said input electrodes.

6. In an electrical illuminating device, the combination of a pair of electric discharge-tube light sources, an electrical power source therefor, and means for generating a low-frequency alternating potential; with substantially potential-operated thermionic control means adapted to be actuated by voltages impressed thereon from said alternating potential generating means, and so arranged and connected as to apply power from said power source to one of said light sources during the positive portions of the potential wave of said generator, and to apply power from said power source to the other of said light sources during the negative portions of said potential wave, whereby said light sources are rendered alternately and successively luminous.

7. In an electrical illuminating device, the combination of a pair of electric discharge-tube different color light sources, an electrical power source therefor, and means for generating a low-frequency alternating potential; with substantially potential-operated thermionic control means adapted to be actuated by voltages impressed thereon from said alternating potential generating means, and so arranged and connected as to apply power from said power source to one of said light sources during the positive portions of the potential wave of said generator, and to apply power from said power source to the other of said light sources during the negative portions of said potential wave, whereby said light sources are rendered alternately and successively luminous in their respective colors.

8. In an electrical illuminating device, the combination of a pair of electric discharge-tube light sources, and an alternating electrical power source therefor; with thermionic switching means effective to connect said power source with and disconnect said power source from said light sources, and a self-oscillating circuit having an oscillation frequency independent of the frequency of said power source, said self-oscillating circuit being connected to said switching means to control the operation thereof so as to render said light sources alternately and successively luminous at the frequency of said self-oscillating circuit.

JOHN C. BATCHELOR.